J. A. ERIKSON.
WIRE CUTTING ATTACHMENT FOR RIFLES.
APPLICATION FILED MAR. 1, 1918.

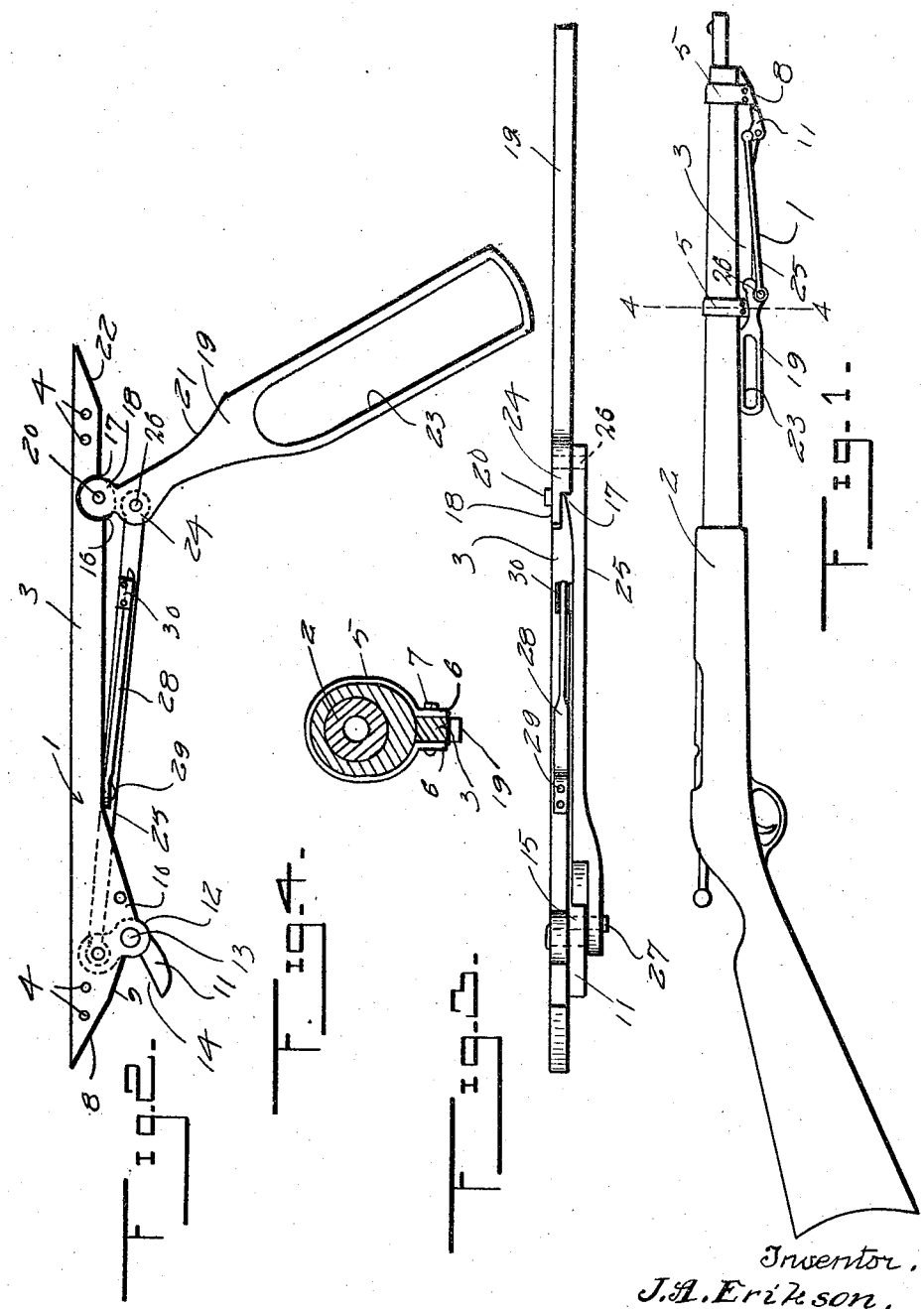

1,300,940.

Patented Apr. 15, 1919.
2 SHEETS—SHEET 2.

Inventor
J. A. Erikson
By
Attorney

UNITED STATES PATENT OFFICE.

JOHN A. ERIKSON, OF POLYTECHNIC, MONTANA.

WIRE-CUTTING ATTACHMENT FOR RIFLES.

1,300,940.    Specification of Letters Patent.    Patented Apr. 15, 1919.

Application filed March 1, 1918. Serial No. 219,909.

*To all whom it may concern:*

Be it known that I, JOHN A. ERIKSON, a subject of the King of Sweden, residing at Polytechnic, in the county of Yellowstone and State of Montana, have invented certain new and useful Improvements in Wire-Cutting Attachments for Rifles; and I do hereby declare the following to be a full, clear, and exact description of the invention, such as will enable others skilled in the art to which it appertains to make and use the same.

The primary object of the invention is to provide an improved device adapted to be secured to a rifle barrel for cutting wire so as to facilitate advancing of troops through barbed wire.

Another object of the invention is the provision of a wire cutting attachment adapted to be secured to the lower surface of a rifle barrel, the means for operating the wire cutting attachment being positioned within convenient reach of the operator's hands.

A further object of the invention is the provision of an improved wire cutter attachment for rifles including an attaching bar having one end sharpened to form a cutting edge, a movable blade pivoted to the attaching bar to coöperate with the sharpened end, and an actuating lever for actuating the movable blade, the forward end of the attaching bar being inclined downwardly to guide the wire to be cut to the cutting blades.

A still further object of this invention is the provision of a wire cutting attachment for rifles of the above stated character, which is durable and efficient when in use, one that is simple and easy to manufacture, and one that can be placed upon the market at a reasonable cost.

With these and other objects in view, the invention consists in the noval construction, arrangement and formation of parts, as will be hereinafter more specifically described, claimed, and illustrated in the accompanying drawing, forming a part thereof, in which:

Figure 1 is a side elevation of a gun equipped with the improved wire cutter.

Fig. 2 is a side elevation of the improved wire clippers removed from a gun showing the same positioned for cutting a wire.

Fig. 3 is a bottom plan view of the wire cutters removed from the gun.

Fig. 4 is a cross section taken on the line 4—4 of Fig. 1.

Figure 5:
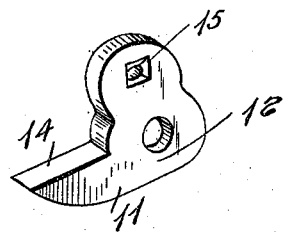
Fig. 5 is a detail perspective view of the cutting blade.
Figure 6:
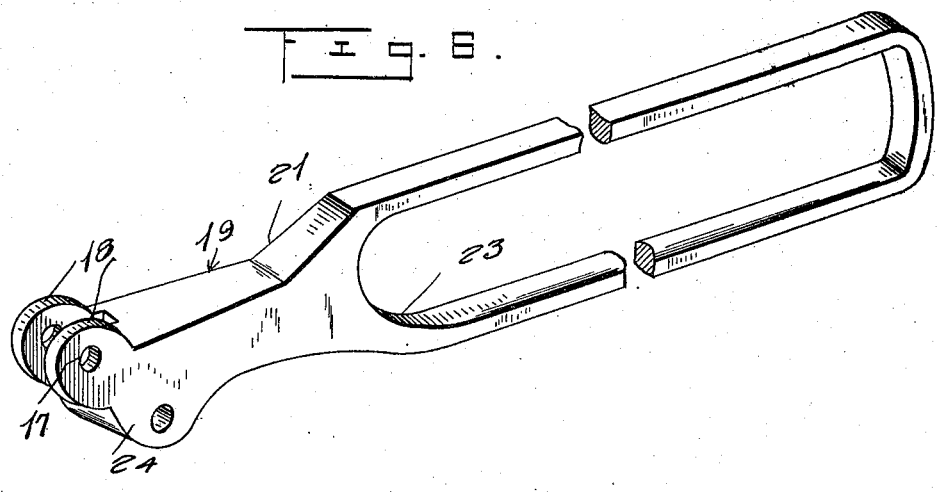
Fig. 6 is a detail perspective view of the operating lever.
Figure 7:
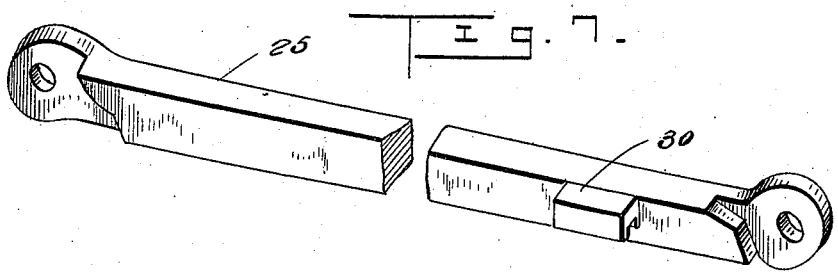
Fig. 7 is a detail perspective view of the connecting link.

Referring to the drawing, in detail, wherein similar reference numerals designate corresponding parts throughout the several views, the numeral 1 generally indicates the improved wire clippers which are adapted to be secured to a gun 2 of the ordinary or any preferred construction. The wire clippers 1 includes an attaching bar 3 having a smooth upper surface for engaging the gun barrel so that the bar can snugly fit the same. and lie below the barrel, the attaching bar 3 can, however, be shaped in any manner desired for fitting the rifle to which it is to be attached. Each end of the bar 2 is provided with a pair of spaced openings 4 which are adapted to register with openings formed in the free ends of the attaching bands 5 which encircle the gun barrel. The ends of the attaching bands 5 are bent downwardly to provide the attaching ears 6 which are positioned on each side of the bar 3 and suitable attaching bolts 7 are extended through the openings 4 and the openings formed in the attaching ears. The forward end of the attaching bar 3 is provided with a downwardly inclined surface 8 which terminates in a cutting edge 9 for a purpose which will hereinafter more fully appear. An attaching ear 10 is formed on the lower edge of the attaching bar 3 adjacent to the cutting edge 9 and pivotally secured to the ear 10 is a blade 11. The blade 11 has its end enlarged as at 12, and is perforated to receive the pivot pin 13 which extends through the ear 10 of the bar. The upper edge of the blade 11 is provided with a cutting edge 14, to coöperate with the cutting edge 9 formed on the attaching bar. Extending upwardly from the enlarged portion 12 of the blade 11 is a lug 15, the purpose of which will hereinafter more fully appear. A downwardly extending ear 16 is formed on the lower surface of the attaching bar 3 adjacent to the rear end thereof, which is received between the fingers 18 which are formed on the upper end of the operating lever 19. The attaching fingers 18 extend at an angle to the operating lever 19 and are formed by bifurcating the upper end of the lever. A suitable pivot pin 20 extends through the attaching fingers 18. The ear 16 and the bar 3 is slightly reduced in thickness so that the same can be readily positioned between the spaced attaching fingers 18. The operating lever 19 has the forward end thereof slightly reduced in thickness and has its upper edge curved as at 21 to conform to the inclined end 22 of the attaching bar so that the same can readily engage the attaching bar and be swung upwardly into engagement with the barrel of the rifle. The operating lever 19 is provided with a suitable longitudinally extending recess 23 for the insertion of the fingers of the hand of the user, so that the lever can be readily swung on its pivot to operate the cutter blade. An attaching ear 24 is formed on the lower surface of the reduced end of the operating lever 19 and a connecting link 25 is pivotally connected to the same by means of a pivot pin 26. The opposite end of the connecting link 25 is pivotally connected to upwardly extending arm 15 of the cutting blade 11 by means of a pivot pin 27. Thus, by operating the handle 19 the blade 11 will be brought into and out of engagement with the cutting edge 9 formed on the attaching bar. A suitable leaf spring 28 is pivoted or otherwise secured to the attaching bar as at 29 and the opposite end of the same slidably engages a guide 30 secured to one side face of the connecting link 25. The leaf spring 28 normally tends to force the connecting link upwardly into engagement with the attaching bar 3 and this holds the movable blade 11 in engagement with the cutting edge 9.

The forward edge of the attaching bar 3 is inclined downwardly as at 8 so as to guide a wire to be cut between the cutting edges 9 and 14 of the blades.

From the foregoing description it can be seen that an improved wire cutter is provided for attachment to a rifle, which can be readily and quickly operated so as to efficiently cut barbed wire entanglements.

In practice, I have found that the form of my invention illustrated in the accompanying drawings and referred to in the above description, as the preferred embodiment, is the most efficient and practical; yet realizing the conditions incident to the adoption of my device will necessarily vary, I desire to state that various minor changes in details of construction, proportion and arrangement of parts may be resorted to, when required without sacrificing any of the advantages of my invention as set forth.

What I claim as new is:

1. In a device of the class described, the combination with a rifle including a barrel, of a wire cutter including an attaching bar, means for securing the attaching bar to a rifle, the attaching bar having its forward edge sharpened, a blade pivoted to the attaching bar adjacent to the sharpened surface thereof, an angular arm formed on the pivoted blade, an operating lever pivoted to the rear end of the attaching bar, a connecting link pivotally connecting the operating lever and the angular arm formed on the pivoted blade, and spring means engaging the link to normally hold the cutting blade in engagement with the sharpened surface of the attaching bar.

2. In a device of the class described, the combination with a rifle including a barrel, of a wire cutter including an attaching bar, a sharpened surface formed on the lower edge of the attaching bar adjacent to the forward end thereof, a blade pivoted to the attaching bar for coöperation with the sharpened surface thereof, an operating lever pivotally secured at its upper end to the attaching bar, a link connecting the pivoted blade and the operating lever, a leaf spring attached at one of its ends to the attaching bar and having its opposite end slidably engaging the connecting link, the forward end of the attaching bar being inclined downwardly to form a guide, as and for the purpose specified.

In testimony whereof I affix my signature in presence of two witnesses.

JOHN A. ERIKSON.

Witnesses:
CHARLES P. GUILBAULT,
IDA EVA LONGER.

Copies of this patent may be obtained for five cents each, by addressing the "Commissioner of Patents, Washington, D. C."